United States Patent [19]
Li et al.

[11] Patent Number: 5,948,382
[45] Date of Patent: Sep. 7, 1999

[54] SELECTIVE OXIDATION OF HYDROGEN SULFIDE IN THE PRESENCE OF MIXED-OXIDE CATALYST CONTAINING IRON, MOLYBDENUM AND ANTIMONY

[75] Inventors: Kuo-Tseng Li; Chun-Hsiung Huang, both of Taichung, Taiwan

[73] Assignee: National Science Council, Taipei, Taiwan

[21] Appl. No.: 08/936,674

[22] Filed: Sep. 24, 1997

Related U.S. Application Data

[63] Continuation-in-part of application No. 08/523,362, Sep. 5, 1995, Pat. No. 5,700,440.

[51] Int. Cl.[6] .............................. B01D 53/52; B01D 53/86
[52] U.S. Cl. ...................... 423/573.1; 423/230; 423/231; 423/576.8; 423/244.04
[58] Field of Search ................................ 423/573.1, 231, 423/230, 244.01, 576.8, 220

[56] References Cited

U.S. PATENT DOCUMENTS

| | | | |
|---|---|---|---|
| 4,814,159 | 3/1989 | Voirin | 423/574 |
| 5,700,440 | 12/1997 | Li et al. | 423/231 |
| 5,728,358 | 3/1998 | Avidan et al. | 423/244.01 |

*Primary Examiner*—Gary P. Straub
*Assistant Examiner*—Eileen E. Nave
*Attorney, Agent, or Firm*—Hitt Chwang & Gaines, P.C.

[57] ABSTRACT

The present invention discloses a method of selectively oxidizing hydrogen sulfide to elemental sulfur, in which a $H_2S$-containing gas mixture contacts with an oxygen-containing gas at about 50–400° C. in the presence of an mixed-oxide catalyst. The reaction product mixture contains substantially no sulfur dioxide. The mixed-oxide catalyst, in addition to iron (III) and molybdate (VI) components, further contains a antimony component as a promoter.

12 Claims, No Drawings

5,948,382

SELECTIVE OXIDATION OF HYDROGEN SULFIDE IN THE PRESENCE OF MIXED-OXIDE CATALYST CONTAINING IRON, MOLYBDENUM AND ANTIMONY

CROSS-REFERENCE TO RELATED APPLICATIONS

This application is a continuation-in-part of U.S. patent application Ser. No. 08/523,362, entitled "Selective Oxidation of Hydrogen Sulfide in the Presence of Iron-Based Catalysts," to Li, et al., filed on Sep. 5, 1995, now U.S. Pat. No. 5,700,440, issued on Dec. 23, 1997. The above-listed application is commonly assigned with the present invention and is incorporated herein by reference as if reproduced herein in its entirety.

FIELD OF THE INVENTION

The present invention relates to a process for recovering elemental sulfur by selectively oxidizing hydrogen sulfide to elemental sulfur, and in particular to a novel catalyst used therein.

BACKGROUND OF THE INVENTION

In the petroleum refinery processes for producing various fuel oils such as gasoline, diesel and kerosene, etc., the sulfur contained in the crude oils is removed as hydrogen sulfide gas by hydrodesulfurization process. The highly toxic hydrogen sulfide gas is then converted to elemental sulfur in sulfur-recovery plants or so-called Claus plants. The Claus plants can be blamed for part of the hydrogen sulfide emissions, as the sulfur-recovery rate is 90–98% depending on the number of reactors used therein. During the last two decades a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is expensive, both in terms of capital investment cost and energy consumption. In order to avoid the shortcoming of these solution-absorption type Claus TGT processes, a dry type Claus TGT process has been developed in Netherlands which comprises recovering elemental sulfur from the Claus tail gas by selective oxidation of hydrogen sulfide in the presence of a catalytically active mixture of iron and chromium oxides deposited on an alpha-alumina support [Oil and Gas Journal, 86(41), p. 68–71, (Oct. 10, 1988); Catalysis Today, 16, p. 263–271, 1993]. The dry type Claus TGT process is simple and economical; however, the chromium atom contained in the catalyst is a toxic substance.

U.S. patent application serial No. 08/523,362, filed Sep. 5, 1995, now allowed to be patented, discloses an iron-based catalyst for recovering elemental sulfur by selectively oxidizing hydrogen sulfide to elemental sulfur. The iron-based catalyst comprises a component selected from cerium, tin, antimony and molybdenum as a promoter. The selectivity of the iron and molybdenum mixed-oxide catalyst is sacrificed, although the conversion thereof is enhanced in comparison with the iron oxide catalyst.

The primary objective of the present process is to provide a process for recovering elemental sulfur from a gas mixture containing hydrogen sulfide by selective oxidation of hydrogen sulfide in the presence of a mixed-oxide catalyst, which has an improved elemental sulfur yield.

DETAILED DESCRIPTION OF THE INVENTION

The possible reactions between hydrogen sulfide and oxygen are as follows:

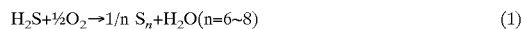

$$H_2S + \tfrac{1}{2}O_2 \rightarrow 1/n\, S_n + H_2O\, (n=6\sim8) \quad (1)$$
$$1/n\, S_n + O_2 \rightarrow SO_2 \quad (2)$$
$$H_2S + \tfrac{3}{2}O_2 \rightarrow SO_2 + H_2O \quad (3)$$
$$3/n\, S_n + 2H_2O \rightarrow 2H_2S + SO_2 \quad (4)$$

In the presence of an appropriate catalyst, such as the iron/chromium oxides used in the prior art [Oil and Gas Journal, 86(41), p. 68–71, (Oct. 10, 1988); Catalysis Today, 16, p. 263–271, 1993], the reaction (1) will take place while the reactions (2) to (4) are inhibited, i.e. the hydrogen sulfide is selectively oxidized to elemental sulfur, wherein the hydrogen sulfide is converted with a high selectivity into elemental sulfur, while the formation of sulfur dioxide ($SO_2$) is very small even in the presence of an overstoichmetric amount of oxygen.

The present invention discloses a novel catalyst suitable for selective oxidation of hydrogen sulfide to elemental sulfur, which is an mixed-oxide catalyst comprising iron (III) oxide, molybdenum (VI) oxide and antimony (III) oxide.

The present invention also discloses a process for recovering elemental sulfur from a gas mixture containing hydrogen sulfide, which comprises contacting said gas mixture with an oxygen-containing gas in a temperature range of about 50° C. to about 400° C. in the presence of an mixed-oxide catalyst consisting essentially of iron (III) oxide, molybdenum (VI) oxide and antimony (III) oxide.

Preferably, the present mixed-oxide catalyst has a molar ratio of antimony atom to iron atom and molybdenum atom ranges from 1:100 to 100:1, preferably 1:10 to 10:1. Preferably, the molar ratio of iron atom to molybdenum atom ranges from 10:1 to 1:10.

The mixed-oxide catalyst can be in the form of monolith, particle or pellet, or deposited on a porous carrier selected from the group consisting of alumina, silica and zeolite.

Preferably, said mixed-oxide catalyst of the process of the present invention is a mixture of iron (III) molybdate and antimony (III) oxide.

Said iron (III) molybdate may be in the form of monolith, particle or pellet, and said antimony (III) oxide may be in the form of monolith, particle or pellet. Said antimony (III) oxide may deposited on said iron (III) molybdate which is in the form of monolith, particle or pellet. Alternatively said iron (III) molybdate may deposited on said antimony (III) oxide which is in the form of monolith, particle or pellet.

Said temperature of the present process preferably ranges from 100° C. to 350° C.

Pressure has no significant effect on the present process. A suitable pressure for contacting said gas mixture with said oxygen-containing gas in the present process is about 1–10 atm.

Said oxygen-containing gas used in the present process includes (but not limited to) air, oxygen-enriched air, and pure oxygen. Preferably air is used as the oxygen-containing gas.

Said gas mixture containing hydrogen sulfide used in the present process has no limitation on the hydrogen sulfide concentration. However, in the SuperClaus-99 process the hydrogen sulfide concentration contained in the tail gas is controlled at 0.8–3 vol % [Oil and Gas Journal, 86(41), p. 68–71, (Oct. 10, 1988); Catalysis Today, 16, p. 263–271, 1993].

The stoichmetric ratio of hydrogen sulfide to oxygen in the reaction (1) is 2:1. Preferably, in the present process said gas mixture is contacted with said oxygen-containing gas to result in a gas having a molar ratio of hydrogen sulfide to oxygen that is less than 2, i.e. with an overstoichmetric amount of oxygen.

The invention will be further illustrated by the following examples. The following examples are only meant to illustrate the invention, but not to limit it.

EXAMPLES

Preparation of Catalysts

Control Example 1
Iron (III) Molybdate Catalyst 24.24 g Fe(NO$_3$)$_3$.9H$_2$O [purchased from Showa Chemical Inc. Japan] and 5.296 g ammonium molybdate [(NH$_4$)$_6$Mo$_7$O$_{24}$.4H$_2$O, manufactured by Riedel-de Haën, Germany] were independently dissolved in 50 ml deionized water. The resulting solutions were mixed (Fe:Mo molar ratio=2:1) and heated at 90° C. while stirring until a slurry was formed. The slurry was dried at 110° C. for 72 hours, and then calcined at 600° C. for five hours to obtain an iron (III) molybdate catalyst in the form of small particle.

Control Example 2
Antimony (III) Oxide Catalyst 0.5 g α-Sb$_2$O$_3$ (purchased from ACROS Inc., New Jersey) was calcined at 500° C. for 5 hours, and added to 50 ml n-pentane (purchased from TEDIA, Inc., Ohio) after cooling. The resulting mixture was heated at 80° C. to evaporate n-pentane therefrom, and then dried at 80° C. for 12 hours to obtain a particulate antimony (III) oxide catalyst.

Example 1
Mixed-Oxide Catalyst of Iron (III) Molybdate and Antimony (III) Oxide 0.5 g α-Sb$_2$O$_3$ (purchased from ACROS Inc., New Jersey) was calcined at 500° C. for 5 hours, and added to 50 ml n-pentane (purchased from TEDIA, Inc., Ohio) after cooling. To the resulting mixture 1.5 g iron (III) molybdate catalyst prepared in the Control Example 1 was added while stirring. The resulting mixture was heated at 80° C. to evaporate n-pentane therefrom, and then dried at 80° C. for 12 hours to obtain a particulate mixed-oxide catalyst of iron (III) molybdate and antimony (III) oxide. It can be understood that the mixed-oxide catalyst prepared in this example is a mechanical mixture of iron (III) molybdate and antimony (III) oxide, because no calcination was carried out after the two oxides were mixed.

Selective Oxidation of Hydrogen Sulfide

Example 2

A continuous fixed bed reactor having an inner diameter of 8 mm, an outer diameter of 10 mm and a length of 80 cm was used in this example. 0.2 g catalyst in the form of 10–20 mesh number particles was packed into the reactor, in which quartz sand was filled at the feed end of the catalyst bed to form a preheating zone. The reaction temperature was controlled by electrical heaters installed around the reactor. The catalyst bed was pre-sulfurized at 250° C. for 8 hours or longer by introducing a high concentration hydrogen sulfide gas mixture (10 vol % H$_2$S) into the reactor at an elevated temperature until a gaseous reaction product leaving the reactor had a stable hydrogen sulfide concentration. After the presulfurization step, a gaseous feed stream consisting of 1 vol % hydrogen sulfide, 5 vol % oxygen and 94 vol % nitrogen was then introduced into the reactor at 400 ml/min. The reaction product exiting the reactor was introduced into a gas-solid separator which was maintained at 25° C., in which the reaction product was separated into a solid product and a gaseous product. The composition of the gaseous product was analyzed by a hp 5890 II gas chromatograph with a 9 feet long Porapak Q80/100 mesh S.S. coiled column.

The reaction conditions and results are listed in Tables 1–3, in which the conversion (%) is defined as the mole of hydrogen sulfide reacted per mole of hydrogen sulfide in the feed stream, the selectivity is defined as the mole of elemental sulfur formed per mole of the reacted hydrogen sulfide, and the yield (%) is defined as the mole of elemental sulfur formed per mole of hydrogen sulfide in the feed stream, which can be calculated as follows:

$$\text{Conversion (\%)} = \frac{\text{H}_2\text{S feeding rate (mole/min.)} - \text{H}_2\text{S exiting rate (mole/min.)}}{\text{H}_2\text{S feeding rate (mole/min.)}} * 100\%$$

$$\text{Selectivity (\%)} = \frac{\text{elemental sulfur formation rate (mole/min.)}}{\text{H}_2\text{S feeding rate (mole/min.)} - \text{H}_2\text{S exiting rate (mole/min.)}} * 100\%$$

$$\text{Yield (\%)} = \text{Conversion} \times \text{Selectivity}$$

The elemental sulfur formation rate (mole/min.) is equal to the hydrogen sulfide feeding rate (mole/min.) subtracts the exiting rate (mole/min.) of hydrogen sulfide and subtracts the exiting rate (mole/min.) of sulfur dioxide in the gas product.

TABLE 1

Iron (III) Molybdate Catalyst Prepared in Control Example 1

| Temperature (° C.) | Conversion (%) | Selectivity (%) | Yield (%) |
|---|---|---|---|
| 180 | 38.9 | 100 | 38.9 |
| 190 | 63.5 | 100 | 63.5 |
| 200 | 74.9 | 100 | 74.9 |
| 210 | 85.7 | 100 | 85.7 |
| 220 | 92.9 | 78 | 72.4 |
| 230 | 100 | 51 | 51 |
| 240 | 100 | 30 | 30 |
| 250 | 100 | 28 | 28 |
| 270 | 100 | 12 | 12 |

TABLE 2

Antimony (III) Oxide Catalyst Prepared in Control Example 2

| Temperature (° C.) | Conversion (%) | Selectivity (%) | Yield (%) |
|---|---|---|---|
| 180 | 7.4 | 100 | 7.4 |
| 230 | 10.5 | 100 | 10.5 |
| 270 | 12.7 | 100 | 12.7 |

TABLE 3

Mixed-Oxide catalyst of Iron (III) Molybdate and Antimony (III) Oxide Prepared in Example 1

| Temperature (° C.) | Conversion (%) | Selectivity (%) | Yield (%) |
|---|---|---|---|
| 180 | 35.8 | 100 | 35.8 |
| 190 | 49.2 | 100 | 49.2 |
| 200 | 57.9 | 100 | 57.9 |
| 210 | 66.9 | 100 | 66.9 |
| 220 | 77.0 | 100 | 77.0 |
| 230 | 89.3 | 100 | 89.3 |
| 240 | 96.4 | 100 | 96.4 |
| 250 | 100 | 100 | 100 |
| 260 | 100 | 100 | 100 |
| 270 | 100 | 49.2 | 49.2 |

Comparing the data of Table 3 with those of Table 1, it can be seen that the mixed-oxide catalyst of iron (III) molybdate and antimony (III) oxide has a significantly higher selectivity for the selective oxidation reaction of $H_2S$ than iron (III) molybdate catalyst while maintaining the high conversion thereof. This indicates that antimony component is an effective promoter to the iron (III) molybdate catalyst for the selective oxidation reaction of $H_2S$ to elemental sulfur.

What is claimed is:

1. A process for recovering elemental sulfur from a gas mixture containing hydrogen sulfide consisting essentially of contacting said gas mixture with an oxygen-containing gas to result in a gas having a molar ratio of hydrogen sulfide to oxygen that is less than 2 in a temperature range of about 240° C. to about 400° C. in the presence of an mixed-oxide catalyst consisting essentially of iron (III) oxide, molybdenum (VI) oxide and antimony (III) oxide wherein said mixed-oxide catalyst has a molar ratio of antimony atom to iron atom and molybdenum atom ranging from 1:10 to 10:1.

2. The process according to claim 1 wherein said mixed-oxide catalyst is presulfurizied prior to said contacting.

3. The process according to claim 1 wherein said mixed-oxide catalyst is a mixture of iron (III) molybdate and antimony (III) oxide.

4. The process according to claim 3 wherein said mixed-oxide catalyst is presulfurizied prior to said contacting.

5. The process according to claim 1 wherein said mixed-oxide catalyst is in the form of monolith, particle or pellet.

6. The process according to claim 3 wherein said mixed-oxide catalyst is in the form of monolith, particle or pellet.

7. The process according to claim 6 wherein said iron (III) molybdate is in the form of monolith, particle or pellet, and said antimony (III) oxide is in the form of monolith, particle or pellet.

8. The process according to claim 6 wherein said iron (III) molybdate is in the form of monolith, particle or pellet, and said antimony (III) oxide is deposited on said iron (III) molybdate.

9. The process according to claim 6 wherein said antimony (III) oxide is in the form of monolith, particle or pellet, and said iron (III) molybdate is deposited on said antimony (III) oxide.

10. The process according to claim 1 wherein said mixed-oxide catalyst is deposited on a porous carrier selected from the group consisting of alumina, silica and zeolite.

11. The process according to claim 1 wherein said oxygen-containing gas is air.

12. A process according to claim 1 wherein said gas mixture contains 0.8–3 vol % of hydrogen sulfide.

* * * * *